(12) United States Patent
Iseki et al.

(10) Patent No.: US 11,511,670 B2
(45) Date of Patent: Nov. 29, 2022

(54) BSM UNIT

(71) Applicant: MURAKAMI CORPORATION, Shizuoka (JP)

(72) Inventors: Kota Iseki, Shizuoka (JP); Dinh Dong Van, Shizuoka (JP); Kosuke Muto, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 71 days.

(21) Appl. No.: 17/121,970

(22) Filed: Dec. 15, 2020

(65) Prior Publication Data

US 2021/0188174 A1 Jun. 24, 2021

(30) Foreign Application Priority Data

Dec. 18, 2019 (JP) .............................. JP2019-228592

(51) Int. Cl.
*B60R 1/06* (2006.01)
*B60R 1/12* (2006.01)

(52) U.S. Cl.
CPC ........ *B60R 1/12* (2013.01); *B60R 2001/1223* (2013.01)

(58) Field of Classification Search
CPC .. B60R 1/12; B60R 2001/1223; B60R 1/1207
See application file for complete search history.

(56) References Cited

U.S. PATENT DOCUMENTS

| | | | | |
|---|---|---|---|---|
| 2008/0316054 | A1* | 12/2008 | Lynam | B60R 1/1207 340/904 |
| 2011/0260845 | A1* | 10/2011 | Henion | B60R 1/08 340/435 |
| 2013/0201012 | A1* | 8/2013 | Belcher | B60R 1/1207 340/425.5 |

* cited by examiner

*Primary Examiner* — Sath V Perungavoor
*Assistant Examiner* — Tyler B Edwards
(74) *Attorney, Agent, or Firm* — Greenblum & Bernstein, P.L.C.

(57) ABSTRACT

A BSM unit according to an embodiment is attached to a side surface facing the vehicle body of a visor of an outer mirror provided to a vehicle body of a vehicle. The BSM unit includes a light source; a housing configured to accommodate the light source; and a lens configured to be attached to the housing and emit light from the light source to the outside of the housing, in which at least a portion of the lens protrudes from the side surface of the visor in an out-of-plane direction of the side surface.

20 Claims, 12 Drawing Sheets

BSM UNIT

TECHNICAL FIELD

The present disclosure relates to a BSM unit.

BACKGROUND

Conventionally, various BSM units (blind spot monitor units) have been known. As a BSM unit, a unit that notifies a driver of a vehicle of an existence of a rear side vehicle by lighting an indicator on a mirror (mirror surface) of an outer mirror attached to a vehicle body of the vehicle is known. However, when the indicator is lit on the mirror of the outer mirror, the indicator is displayed together with the scenery reflected on the mirror or sunlight, so that there is a problem that it is difficult to see the indicator.

U.S. Patent Application Publication No. 2008/0316054 describes a blind spot indicator provided in a mirror assembly that includes an outer mirror that is attached to the vehicle body of the vehicle. The mirror assembly includes a reflective mirror that faces the rear of the vehicle and a casing that surrounds and holds the reflective mirror. The casing is attached to a side portion of the vehicle via a stem. The casing has a side portion facing the vehicle body side of the vehicle, and a blind spot indicator is displayed on the side portion.

The blind spot indicator includes a light source including an LED and a lens that guides light from the light source. The light from the light source is guided by the lens and emitted to the outside of the casing, so that an icon can be displayed on the side portion, and the display of the icon notifies the driver of the vehicle that the rear side vehicle has been detected.

SUMMARY

In the blind spot indicator described above, since the icon is displayed on the side portion of the casing, the driver of the own vehicle facing the side portion can visually recognize the icon. By the way, especially in recent years, it is required that drivers, passengers, road users, and the like of another vehicle also visually recognize the indicator. If the driver or the like of another vehicle can visually recognize the indicator of the own vehicle, the driver or the like of another vehicle can grasp an existence of the own vehicle.

However, in the blind spot indicator described above, since the side portion of the casing of the mirror assembly faces the driver of the own vehicle and displays the icon on the side portion, the driver or the like of another vehicle cannot visually recognize the icon. That is, since the icon is displayed on the side of the casing itself, it is difficult for anyone other than the driver of the own vehicle to visually recognize the icon. If the driver or the like of another vehicle cannot visually recognize the icon of the own vehicle, it may be difficult for the driver or the like of another vehicle to notice the existence of the own vehicle, which may give anxiety to the driver of the own vehicle.

It is an object of the present disclosure to provide a BSM unit that can be visually recognized by a driver or the like of another vehicle.

A BSM unit according to one aspect of the present disclosure is attached to a side surface facing the vehicle body of a visor of an outer mirror provided to a vehicle body of a vehicle. The BSM unit includes a light source; a housing configured to accommodate the light source; and a lens configured to be attached to the housing and emit light from the light source to the outside of the housing, in which at least a portion of the lens protrudes from the side surface of the visor in an out-of-plane direction of the side surface.

The BSM unit is provided on the side surface of the visor of the outer mirror facing the vehicle body. Therefore, since the indicator of the BSM unit is not displayed on the mirror of the outer mirror but on the visor, an indicator can be displayed at a place different from a scenery reflected on the mirror. Therefore, the indicator can be easily visually recognized. The BSM unit includes the lens that is attached to the housing that accommodates the light source and emits the light to the outside of the housing. At least a portion of the lens protrudes from the side surface of the visor in the out-of-plane direction of the side surface. Therefore, since at least a portion of the lens that emits the light to the outside protrudes in the out-of-plane direction of the side surface of the visor, the driver or the like of another vehicle can visually recognize the light from the lens. If the light emitting surface from the lens is flush with the side surface of the visor, an emitting direction of the light may be limited to the driver side of the own vehicle. However, in the BSM unit, since at least a portion of the lens protrudes from the side surface of the visor, an emitting direction of the light from the lens is not limited to a driver side of the own vehicle, and includes a wide range such as a rear side of the own vehicle, and the like. Therefore, since the light from the lens can be visually recognized by the driver or the like of another vehicle on the rear side, the driver or the like of another vehicle can grasp an existence of the own vehicle.

A BSM unit according to another aspect of the present disclosure is attached to a side surface facing the vehicle body of a visor of an outer mirror provided to a vehicle body of a vehicle. The BSM unit includes a light source; a housing configured to accommodate the light source; and a lens configured to be attached to the housing and emit light from the light source to the outside of the housing, in which the visor is positioned on a rear side of the vehicle on the side surface and has an edge portion surrounding a mirror of the outer mirror, and at least a portion of the lens is exposed on the side surface of the visor and reaches the edge portion of the visor.

Like the BSM unit described above, the BSM unit is provided on the side surface of the visor facing the vehicle body. Therefore, since an indicator can be displayed at a place different from a scenery reflected on the mirror, the indicator can be easily and visually recognized. At least a portion of the lens is exposed on the side surface of the visor and reaches the edge portion of the visor. The edge portion of the visor is positioned on the rear side of the vehicle when viewed from the side surface of the visor. Therefore, since the lens that emits the light to the outside is exposed on the side surface of the visor and reaches the edge portion of the visor, an emitting direction of the light from the lens is not limited to a driver side of the own vehicle, but includes a wide range such as a rear of the own vehicle. Therefore, since the light from the lens can be visually recognized by the driver or the like of another vehicle on the rear side, the driver or the like of another vehicle can grasp an existence of the own vehicle.

In addition, a height of the lens with respect to the side surface of the visor may increase toward the rear side of the vehicle. In this case, since the height of the lens increases toward the rear side, it is possible to make it easier for a driver of another vehicle on the rear side to visually recognize the shinning lens. In addition, when the height of the lens increases toward the rear side, the BSM unit can be easily assembled to the visor.

In addition, the lens may be provided on the rear side of the vehicle on the side surface of the visor. In this case, since the lens is provided on the rear side of the vehicle on the side surface of the visor, the lens is provided at a position close to the mirror of the outer mirror. Therefore, since a distance from the line of sight of the driver of the own vehicle that visually recognizes the mirror to the lens can be shortened, the driver of the own vehicle can more easily and visually recognize the lens. In addition, by providing the lens on the rear side of the side surface of the visor, it becomes easier for the driver of another vehicle on the rear side to visually recognize the shinning lens.

According to the present disclosure, it is possible to provide the BSM unit that can be visually recognized by the driver or the like of another vehicle.

DETAILED DESCRIPTION

Figure 1:
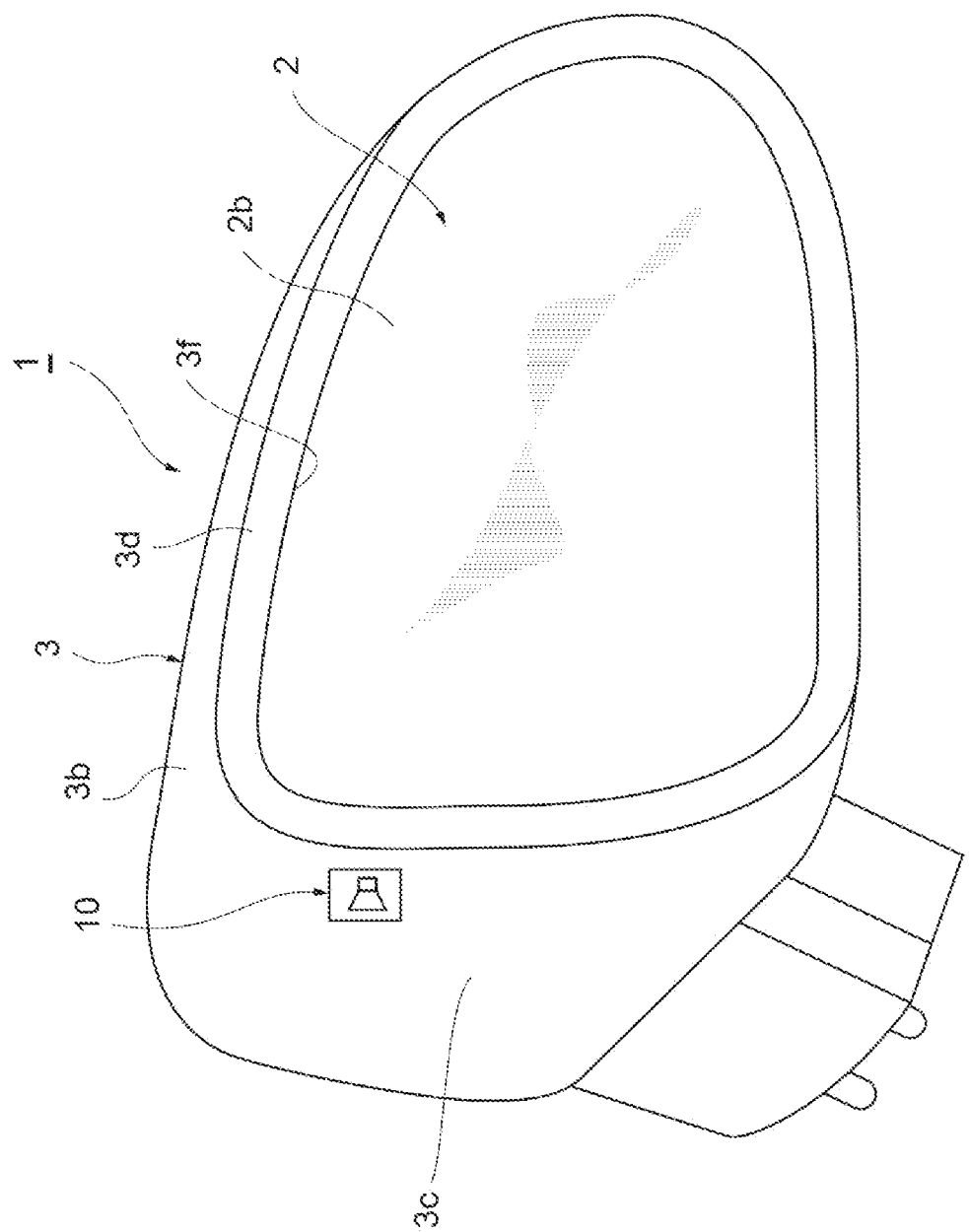
FIG. 1 is a perspective view illustrating an exemplary outer mirror on which a BSM unit according to an embodiment of the present disclosure is mounted.

Hereinafter, embodiments of a BSM unit according to the present disclosure will be described with reference to the drawings. In the description of the drawings, the same or corresponding elements are designated by the same reference numerals, and a duplicated description will be omitted as appropriate. In addition, the drawings may be partially simplified or exaggerated for ease of understanding. Further, the dimensional ratio and the like are not limited to those described in the drawings.

First, an exemplary outer mirror 1 to which a BSM unit 10 according to the present embodiment is applied will be described. As illustrated in FIG. 1, the outer mirror 1 is an outer mirror provided on a vehicle body of an own vehicle, and is provided, for example, diagonally in front of a driver's seat of the own vehicle. In the present disclosure, the "own vehicle" refers to a vehicle equipped with the BSM unit according to the present disclosure, and the "another vehicle" refers to another vehicle different from the own vehicle. "Another vehicle" may include a following vehicle, a rear side vehicle, or an overtaking vehicle of the own vehicle.

The BSM unit 10 is provided on, for example, the outer mirror 1 on the right side of the own vehicle and the outer mirror 1 on the left side of the own vehicle, respectively. The BSM unit 10 is visible not only to the own vehicle but also to other road users, for example. Other road users include pedestrians who visually recognize the own vehicle on which the BSM unit 10 is mounted, and occupants of another vehicle. Since the BSM unit 10 is visible to other road users, it is possible to make other road users grasp an existence of the own vehicle.

The outer mirror 1 according to the present embodiment includes, for example, a mirror 2 which is a mirror main body having a mirror surface 2b, and a visor 3 which surrounds the mirror surface 2b of the mirror 2 and holds the mirror 2. As an example, a color of the visor 3 is black. In the present disclosure, black includes not only black but also navy blue, purple, brown, gray, and dark green with a color scheme close to black.

The visor 3 includes, for example, an upper surface 3b facing vertically upward, a side surface 3c facing the vehicle body side (positioned on the driver's seat side), and an edge portion 3d surrounding the mirror 2. The upper surface 3b and the side surface 3c are, for example, smoothly connected to each other. The edge portion 3d is, for example, directed to the rear side of the own vehicle and has an opening 3f facing the rear side of the own vehicle. The mirror surface 2b of the mirror 2 is exposed at the opening 3f.

Figure 2:
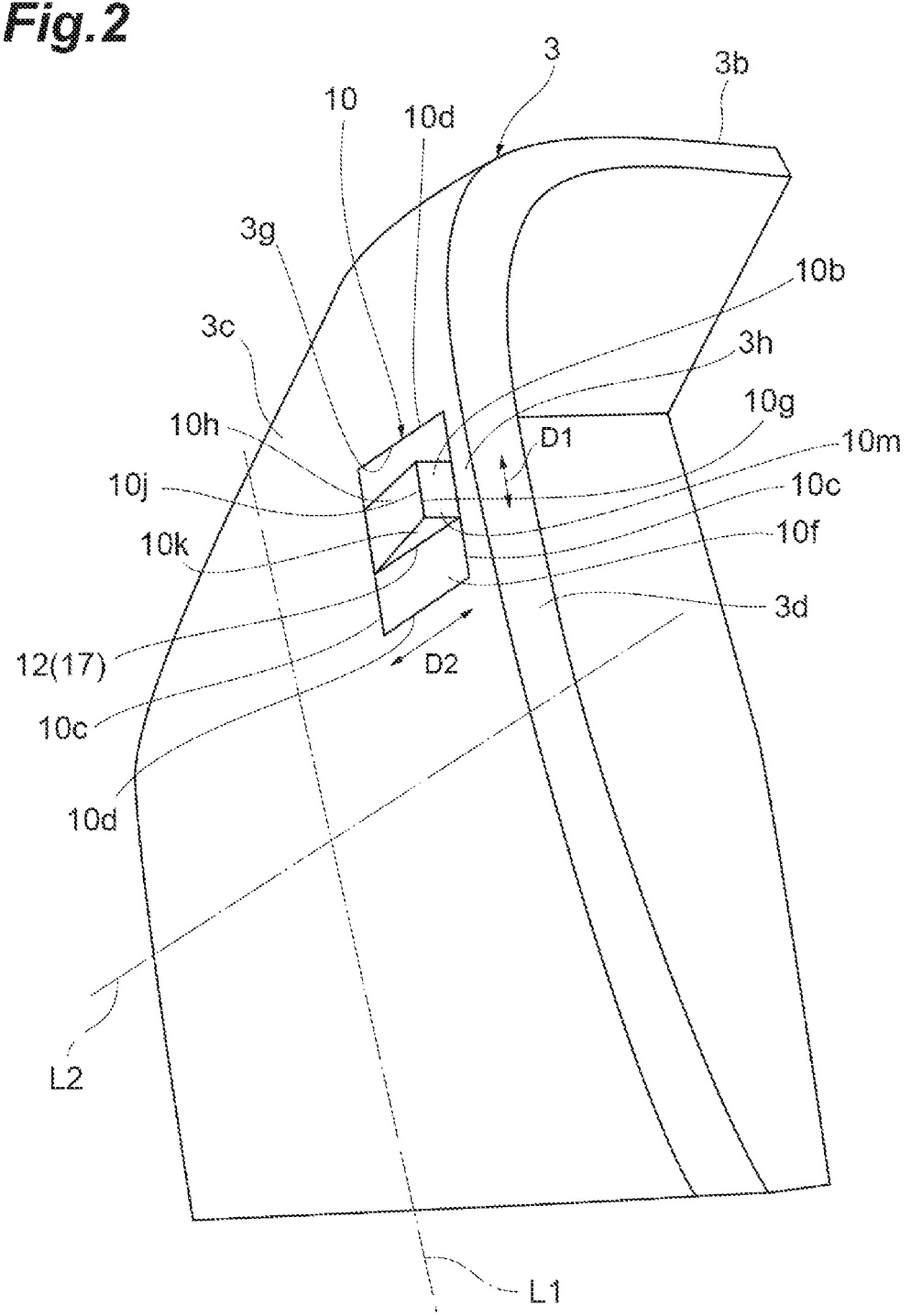
FIG. 2 is a perspective view illustrating a lens of the BSM unit of FIG. 1, a side surface of a visor of the outer mirror, and an edge portion.

As illustrated in FIGS. 1 and 2, the BSM unit 10 is exposed on the side surface 3c of the visor 3. The BSM unit 10 is exposed from the opening 3g formed in the side surface 3c of the visor 3. At least a portion of the BSM unit 10 projects from the side surface 3c in an out-of-plane direction of the side surface 3c, for example. An exposure portion 10b (exposed portion) of the BSM unit 10 is lit by a light source 15 (see FIG. 7) provided inside the BSM unit 10, and an indicator is displayed by the lighting of the exposure portion 10b.

For example, the exposure portion 10b of the BSM unit 10 has a square shape (as an example, a rectangular shape) having a pair of long sides 10c extending along a first direction D1 in which the edge portion 3d extends and a pair of short sides 10d extending in a second direction D2 intersecting the edge portion 3d. As an example, the second direction D2 is orthogonal to the first direction D1. The exposure portion 10b of the BSM unit 10 is provided on the rear side of the own vehicle on the side surface 3c of the visor 3, and is provided, for example, at a position closer to the edge portion 3d of the visor 3.

The BSM unit 10 is positioned, for example, on the rear side (edge portion 3d side) of the own vehicle from a reference line L1 that passes through the center of the second direction D2 on the side surface 3c of the visor 3 and extends in the first direction D1. As an example, the BSM unit 10 is positioned on the upper surface 3b side from a reference line L2 that passes through the center of the first direction D1 on the side surface 3c and extends in the second direction D2. The BSM unit 10 is provided at a position adjacent to the edge portion 3d, and for example, a linear portion 3h extending along the first direction D1 is formed between the BSM unit 10 and the edge portion 3d.

The exposure portion 10b of the BSM unit 10 includes, for example, a smooth surface 10f recessed with respect to the side surface 3c of the visor 3, and a convex portion 10g protruding from the side surface 3c. The smooth surface 10f is, for example, a flat surface. The convex portion 10g includes an inclined surface 10h that gradually rises from an end portion opposite to the edge portion 3d, and a top portion 10j positioned on the edge portion 3d side of the inclined surface 10h.

Due to the inclined surface 10h and the top portion 10j, the exposure portion 10b of the BSM unit 10 becomes higher toward the rear side (edge portion 3d side) of the own vehicle. For example, the convex portion 10g may further include a first side surface 10k extending from the inclined surface 10h to the smooth surface 10f, and a second side surface 10m extending from the top portion 10j to the smooth surface 10f. Note that the shape and position of the exposure portion 10b are not limited to the above examples and can be changed as appropriate.

Figure 3:
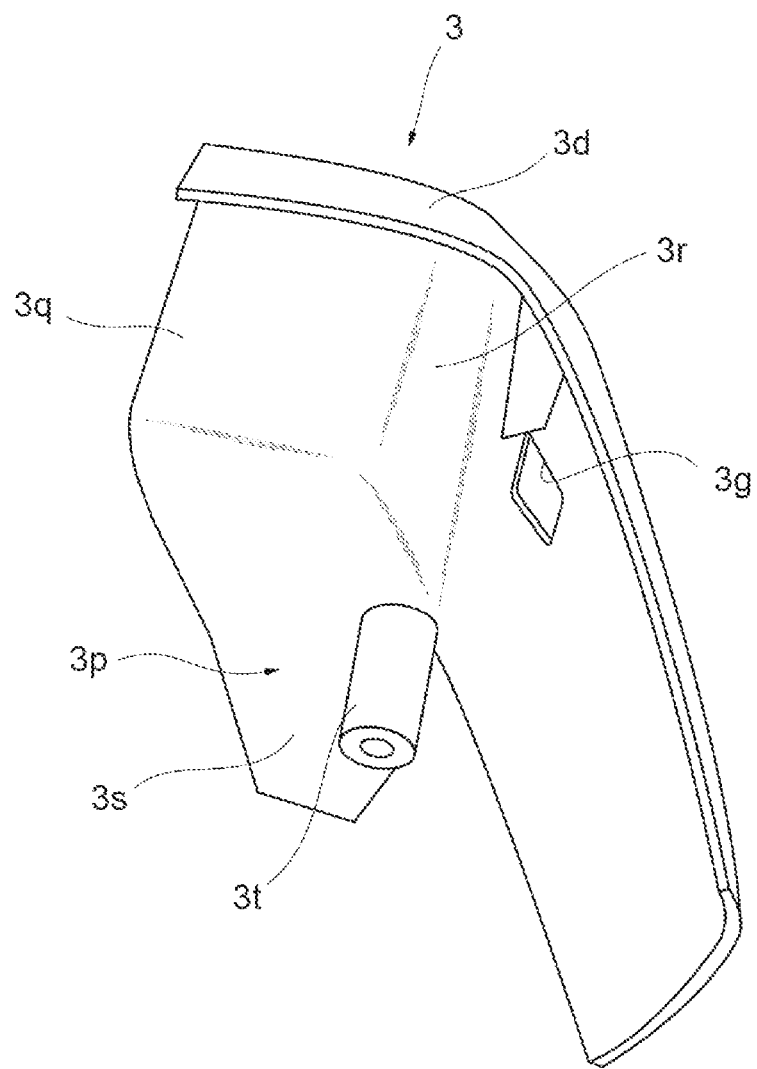
FIG. 3 is a perspective view of the visor of FIG. 2 as viewed from a direction different from that of FIG. 2.
Figure 4:
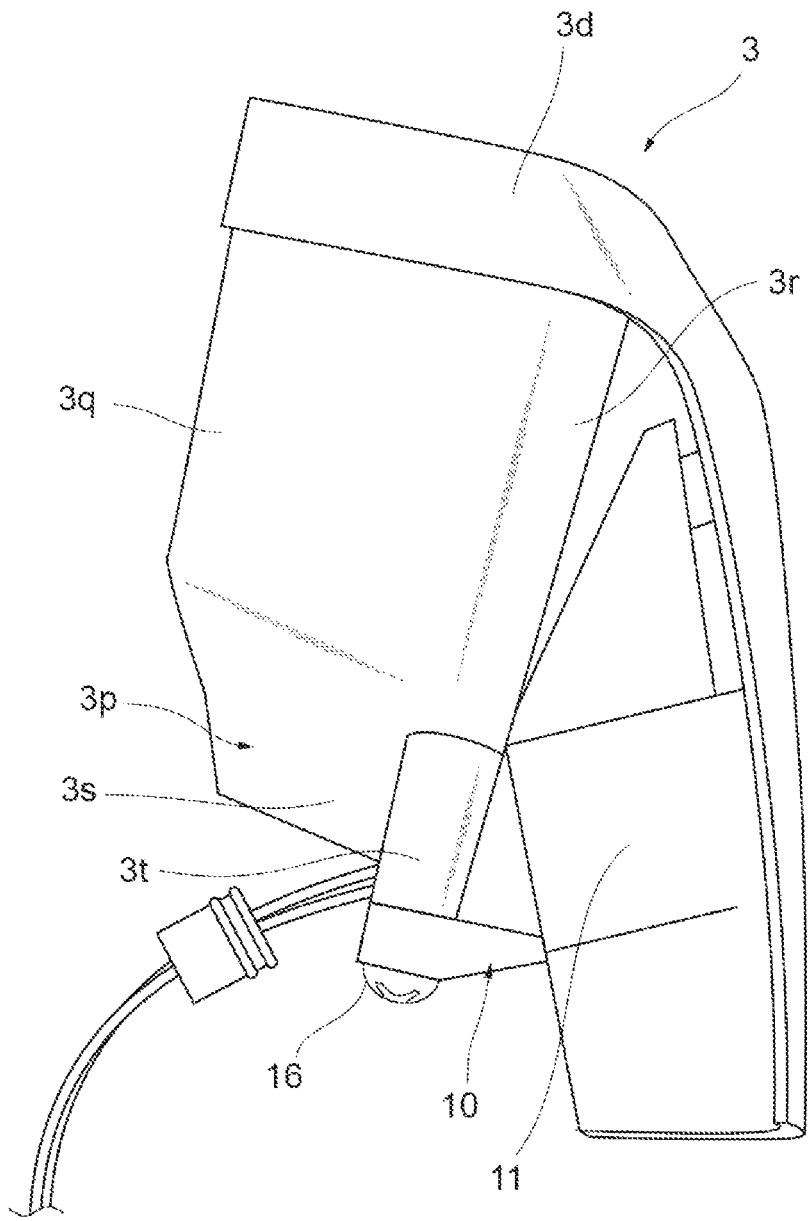
FIG. 4 is a perspective view schematically illustrating the BSM unit attached to the visor of FIG. 3.

FIG. 3 is a schematic perspective view of the opening 3g of the visor 3 as viewed from the inside of the visor 3. FIG. 4 is a schematic perspective view illustrating the BSM unit 10 attached to the side surface 3c of the visor 3 from the inside of the visor 3. As illustrated in FIGS. 3 and 4, the visor 3 has a wall surface 3p extending from the edge portion 3d to the inside of the visor 3. The BSM unit 10 is mounted on the wall surface 3p, for example. The wall surface 3p is, for example, a portion that is not visible from the outside of the visor 3.

The wall surface 3p includes a first wall surface 3q extending along the upper surface 3b of the visor 3, a second wall surface 3r facing the side surface 3c, and a third wall surface 3s extending downward from an end portion opposite to the edge portion 3d of the first wall surface 3q. A tubular portion 3t protrudes from the second wall surface 3r and the third wall surface 3s, and as an example, the BSM unit 10 is attached to the tubular portion 3t. The third wall surface 3s extends along the mirror 2 on a back side of the mirror 2 held by the visor 3.

Figure 5:
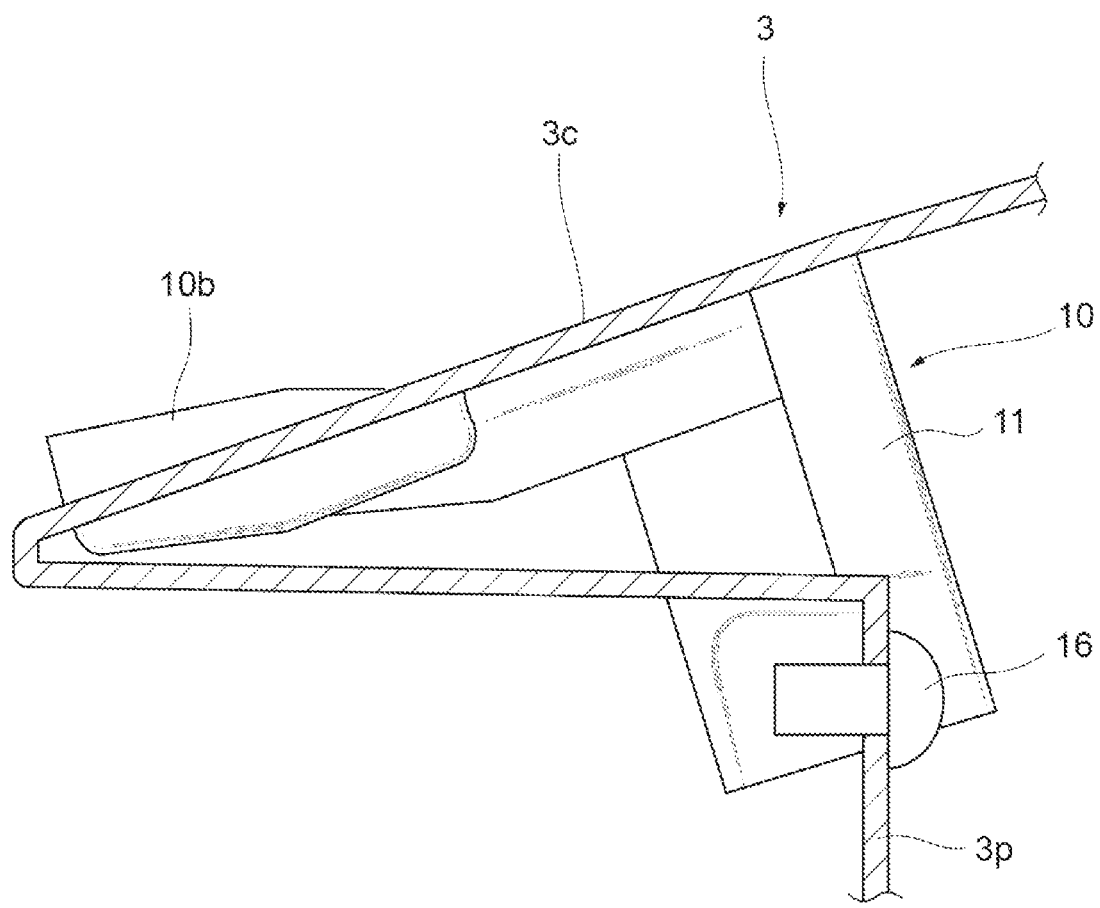
FIG. 5 is a cross-sectional view illustrating the BSM unit and the visor of FIG. 4.

FIG. 5 is a cross-sectional view illustrating an example of an attaching structure of the BSM unit 10 to the side surface 3c of the visor 3. As illustrated in FIG. 5, the BSM unit 10 includes a housing 11 that accommodates a light source 15, which will be described later, and for example, the housing 11 may be fixed to the wall surface 3p of the visor 3 via a screw 16.

Figure 6:
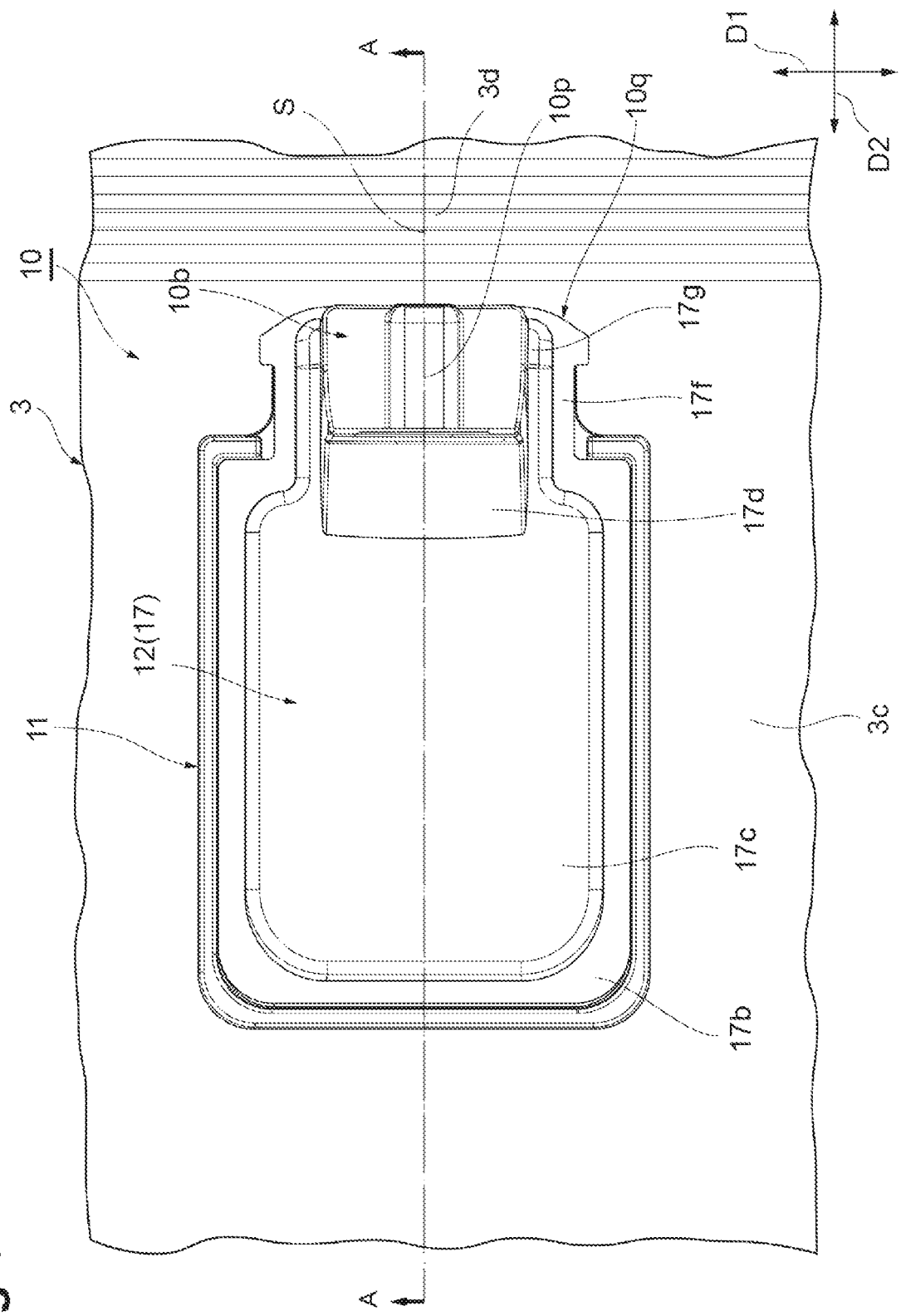
FIG. 6 is a plan view illustrating the BSM unit of FIG. 4.
Figure 7:
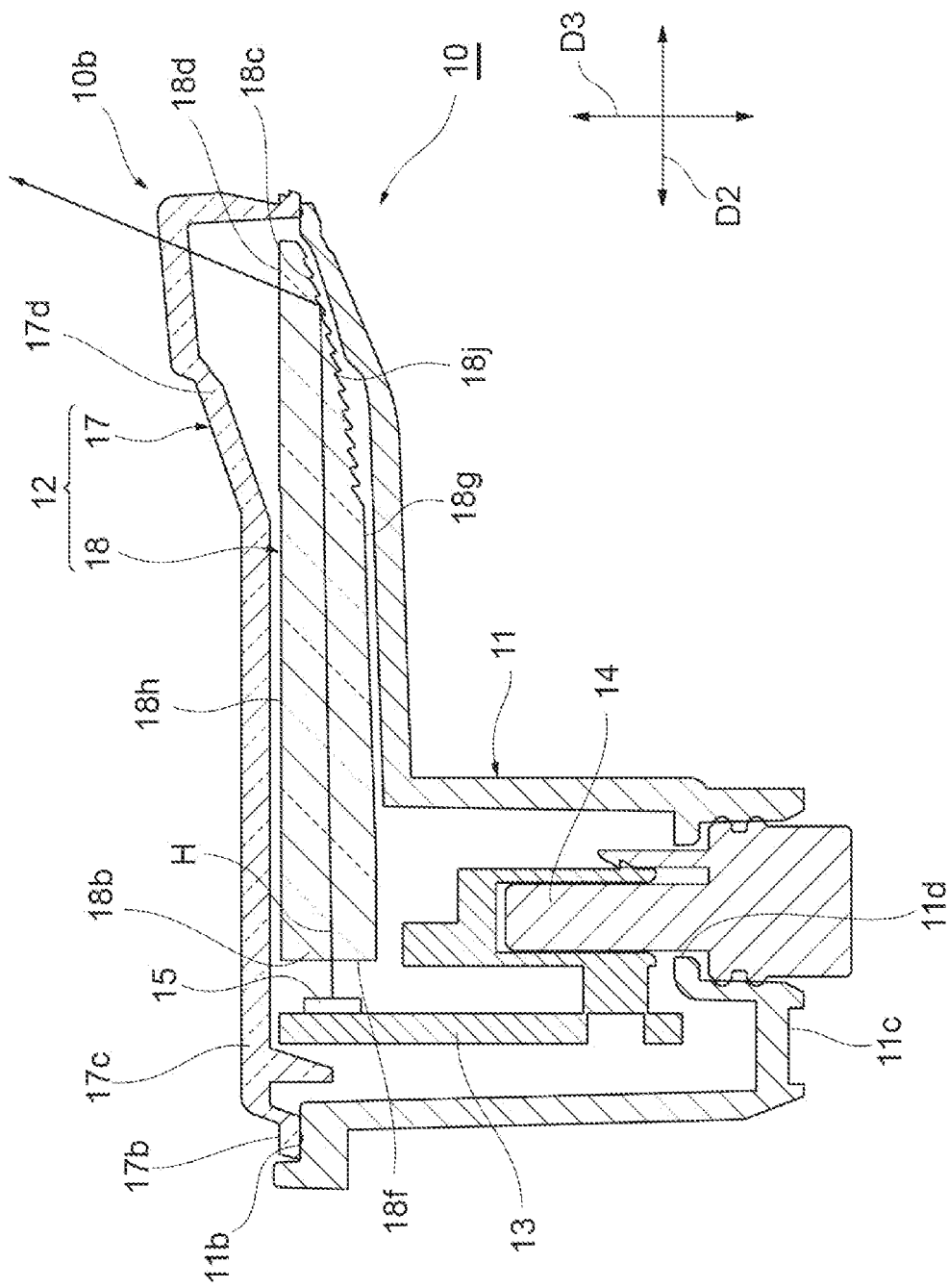
FIG. 7 is a sectional view taken along line A-A of the BSM unit of FIG. 6.

FIG. 6 is a plan view illustrating the BSM unit 10. FIG. 7 is a cross-sectional view taken along line A-A of FIG. 6. As illustrated in FIGS. 6 and 7, the shape of the exposure portion 10b of the BSM unit 10 is bilateral-symmetrical with respect to the cross section taken along line A-A of FIG. 6. The cross section taken along line A-A is a cross section S that includes the center 10p of the exposure portion 10b and the edge portion 3d of the visor 3 and is orthogonal to the side surface 3c of the visor 3. The cross section S extends, for example, in both the above-mentioned second direction D2 and the third direction D3 orthogonal to the side surface 3c.

When the BSM unit 10 is viewed along the third direction D3, the BSM unit 10 has a short side extending in the first direction D1 and a long side extending in the second direction D2, and has a protruding portion 10q protruding toward the edge portion 3d side. The protruding portion 10q protrudes toward the edge portion 3d (to the right in FIG. 6), for example, in a region including the center of the first direction D1 of the BSM unit 10.

For example, the shape of each portion of the BSM unit 10 is bilateral-symmetrical with respect to the cross section S. In this way, since each portion of the BSM unit 10 has a bilateral-symmetrical shape with respect to the cross section S, the configuration of the BSM unit 10 attached to the right side of the vehicle and the configuration of the BSM unit 10 attached to the left side of the vehicle can be shared.

The BSM unit 10 includes a light source 15, a housing 11 that accommodates the light source 15, and a lens 12 that emits light H from the light source 15 to the outside of the BSM unit 10. The light source 15 is, for example, an LED light source. The BSM unit 10 emits light H from the exposure portion 10b to the outside of the BSM unit 10 to display an indicator that alerts the driver of the own vehicle or makes other road users grasp the existence of the own vehicle. The lens 12 is attached to the housing 11. For example, the BSM unit 10 further includes a circuit board 13 which is a printed circuit board (PCB) on which the light source 15 is mounted, and a connector portion 14 which is electrically connected to the light source 15 via the circuit board 13.

At least portion (exposure portion 10b) of the lens 12 is exposed on the side surface 3c of the visor 3. The lens 12 includes an outer lens 17 having the exposure portion 10b of the BSM unit 10 and an inner lens 18 positioned inside the outer lens 17. The outer lens 17 and the inner lens 18 are separated from each other, for example.

The outer lens 17 is bilateral-symmetrical with respect to the cross section S, for example. As an example, the outer lens 17 has a base portion 17b mounted on the housing 11, a first convex portion 17c protruding from the base portion 17b, and a second convex portion 17d further protruding from the first convex portion 17c.

When viewed from the third direction D3, the base portion 17b is positioned inside the housing 11, the first convex portion 17c is positioned inside the base portion 17b, and the second convex portion 17d is positioned inside the first convex portion 17c. When viewed from the third direction D3, the shape of at least a portion of the base portion 17b and the first convex portion 17c is, for example, a rounded rectangular shape.

The base portion 17b has a first protruding portion 17f constituting the protruding portion 10q of the BSM unit 10, and the first convex portion 17c has a second protruding portion 17g constituting the protruding portion 10q. Both the first protruding portion 17f and the second protruding portion 17g protrude toward the edge portion 3d side. The second convex portion 17d is provided on, for example, the second protruding portion 17g of the first convex portion 17c, and the shape of the second convex portion 17d seen from the third direction D3 is rectangular. As an example, the above-mentioned exposure portion 10b is provided on the end portion side (edge portion 3d side) of the second convex portion 17d in the second direction D2.

The outer lens 17 is a lens in which a portion thereof is exposed on the side surface 3c of the visor 3. The light H emitted from the light source 15 is incident on the outer lens 17 via the inner lens 18, and is emitted from the outer lens 17 to the outside of the BSM unit 10. As a result, the lens 12 shines and the BSM unit 10 becomes visible. For example, the BSM unit 10 displays an indicator that lights up when another vehicle approaches by illuminating the lens 12, thereby alerting the driver of the own vehicle and making other road users aware of the existence of the own vehicle.

A transmittance of the light H of the outer lens 17 is lower than, for example, the transmittance of the light H of the inner lens 18. As an example, the transmittance of the light H of the outer lens 17 is about 40%, and the transmittance of the light H of the inner lens 18 is about 90%. For example, the inner lens 18 is colorless and transparent, and the outer lens 17 is colored in black and transparent. As described above, since the color of the outer lens 17 is colored in black and transparent, the color of the outer lens 17 can be brought close to the black color of the visor 3, so that the design of the visor 3 can be enhanced.

The housing 11 includes an insertion portion 11d into which the connector portion 14 is inserted into a surface 11c facing the side opposite to the surface 11b on which the outer lens 17 is placed. The insertion portion 11d has, for example, a tubular shape recessed from the surface 11c, and the connector portion 14 is inserted into the circuit board 13 by inserting the connector portion 14 inside the insertion portion 11d. By inserting the connector portion 14 into the circuit board 13 in this way, power is supplied to the light source 15 via the connector portion 14 and the circuit board 13.

Figure 8:
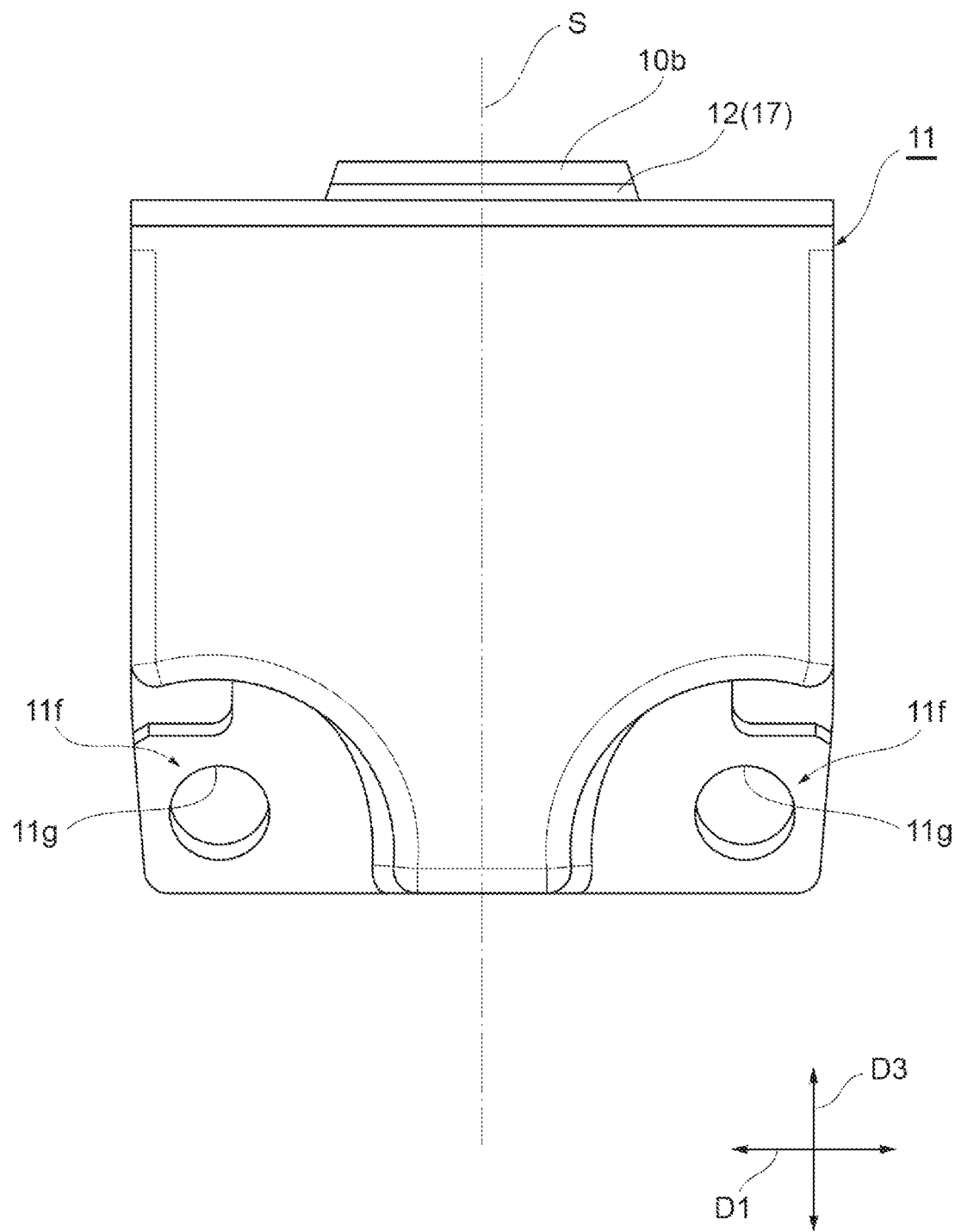
FIG. 8 is a side view of a housing of the BSM unit of FIG. 6.
Figure 9:
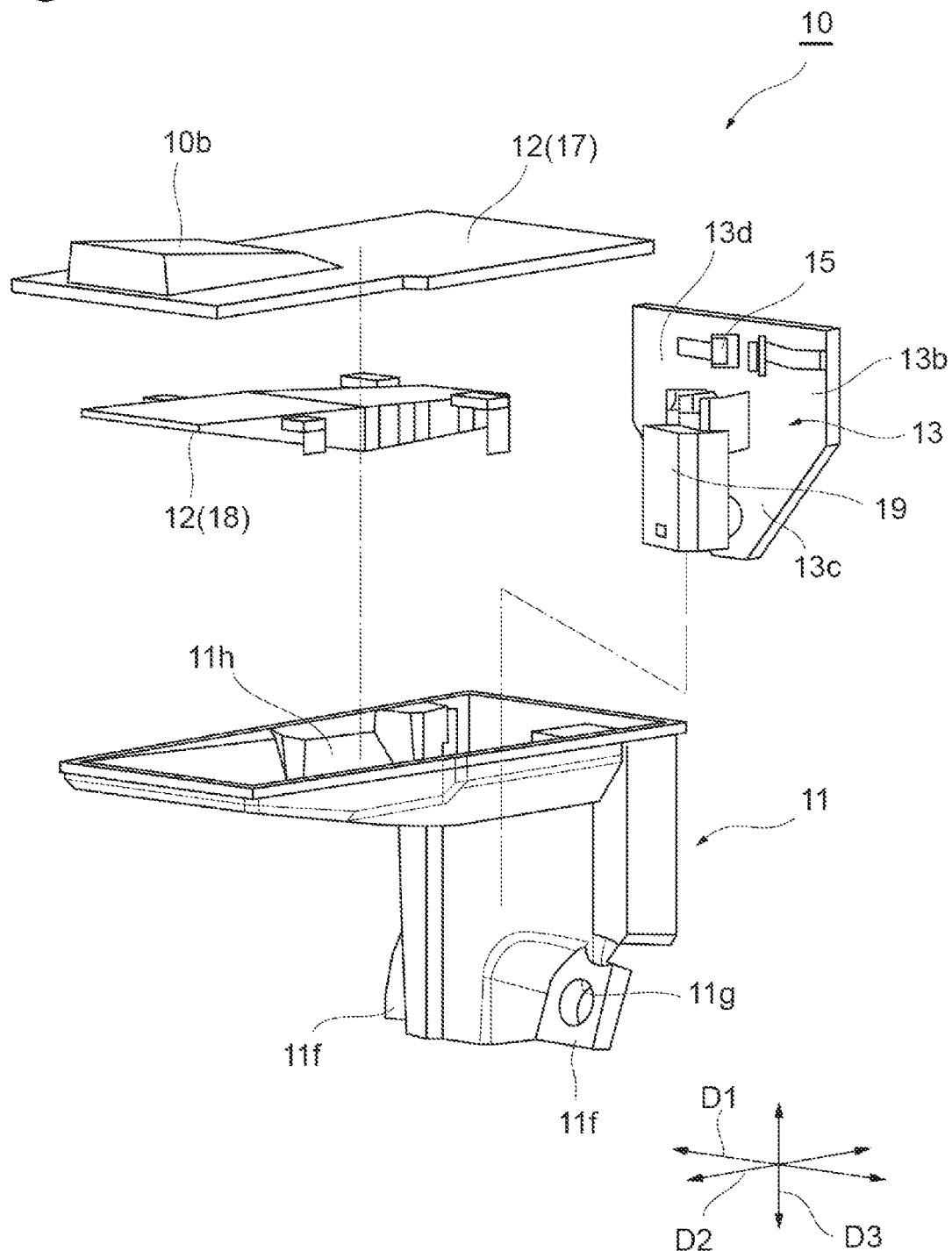
FIG. 9 is an exploded perspective view of the BSM unit of FIG. 6.

FIG. 8 is a side view illustrating the housing 11. FIG. 9 is an exploded perspective view of the BSM unit 10. As illustrated in FIGS. 8 and 9, the housing 11 is bilateral-symmetrical with respect to the cross section S. The shape of the housing 11 when viewed along the second direction D2 is, for example, rectangular, and the housing 11 has a pair of fixing portions 11f fixed to the visor 3.

The pair of fixing portions 11f are bilateral-symmetrical with respect to the cross section S, for example. The fixing portion 11f has, for example, a plate shape having a hole portion 11g into which the screw 16 described above is inserted. As an example, each fixing portion 11f is inclined toward a center side of the second direction D2 of the housing 11 with respect to the third direction D3. For example, the BSM unit 10 is firmly fixed to the visor 3 by inserting the screw 16 into the hole portion 11g of each fixing portion 11f and screwing the screw 16 into the wall surface 3p.

The housing 11 has an accommodation space 11h for accommodating the circuit board 13 on which the light source 15 is mounted and the inner lens 18. The circuit board 13 has, for example, a plate shape extending in both the first direction D1 and the third direction D3. The circuit board 13 has a first portion 13b, which is rectangular, and a second portion 13c, which is positioned in a back side of the accommodation space 11h of the first portion 13b and becomes narrower toward the back side of the accommodation space 11h. As an example, the second portion 13c has a trapezoidal shape.

The light source 15 and a receptacle portion 19 that accommodates the connector portion 14 are mounted on the surface 13d of the circuit board 13 that faces the outer lens 17 side. For example, the connector portion 14 and the receptacle portion 19 may be bilateral-symmetrical with respect to the cross section S described above. The connector portion 14 is electrically connected to the light source 15 via the circuit board 13 by being inserted into the receptacle portion 19.

On the surface 13d of the circuit board 13 facing the inside of the housing 11, the light source 15 and the receptacle portion 19 are arranged so as to be in parallel vertically, for example. As an example, the light source 15 is mounted on the first portion 13b of the circuit board 13, and the receptacle portion 19 is mounted on the second portion 13c of the circuit board 13. The inner lens 18 is arranged to face the light source 15. The inner lens 18 faces, for example, the light source 15 along the second direction D2.

Figure 10:
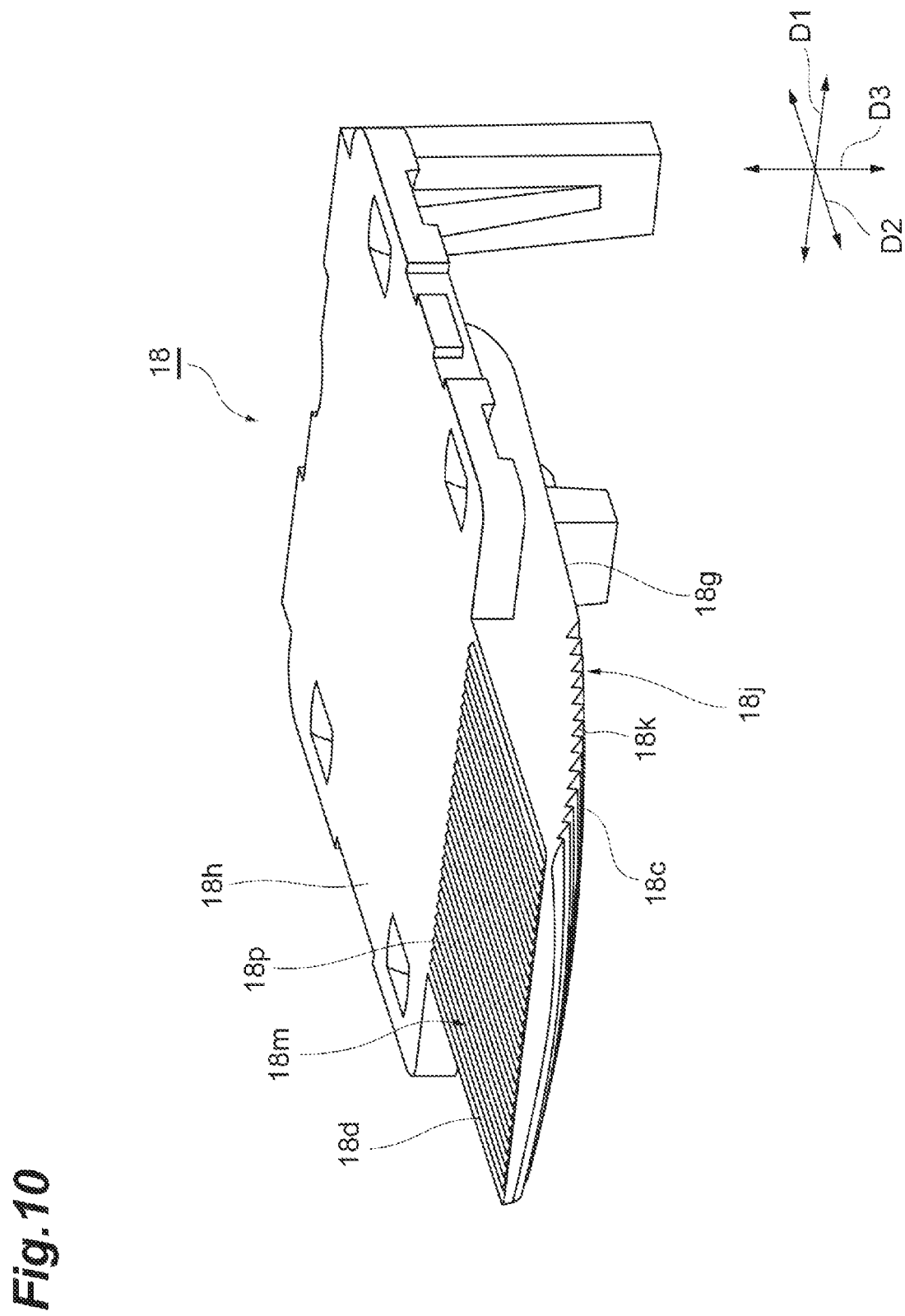
FIG. 10 is a perspective view illustrating an inner lens of the BSM unit of FIG. 6.
Figure 11:
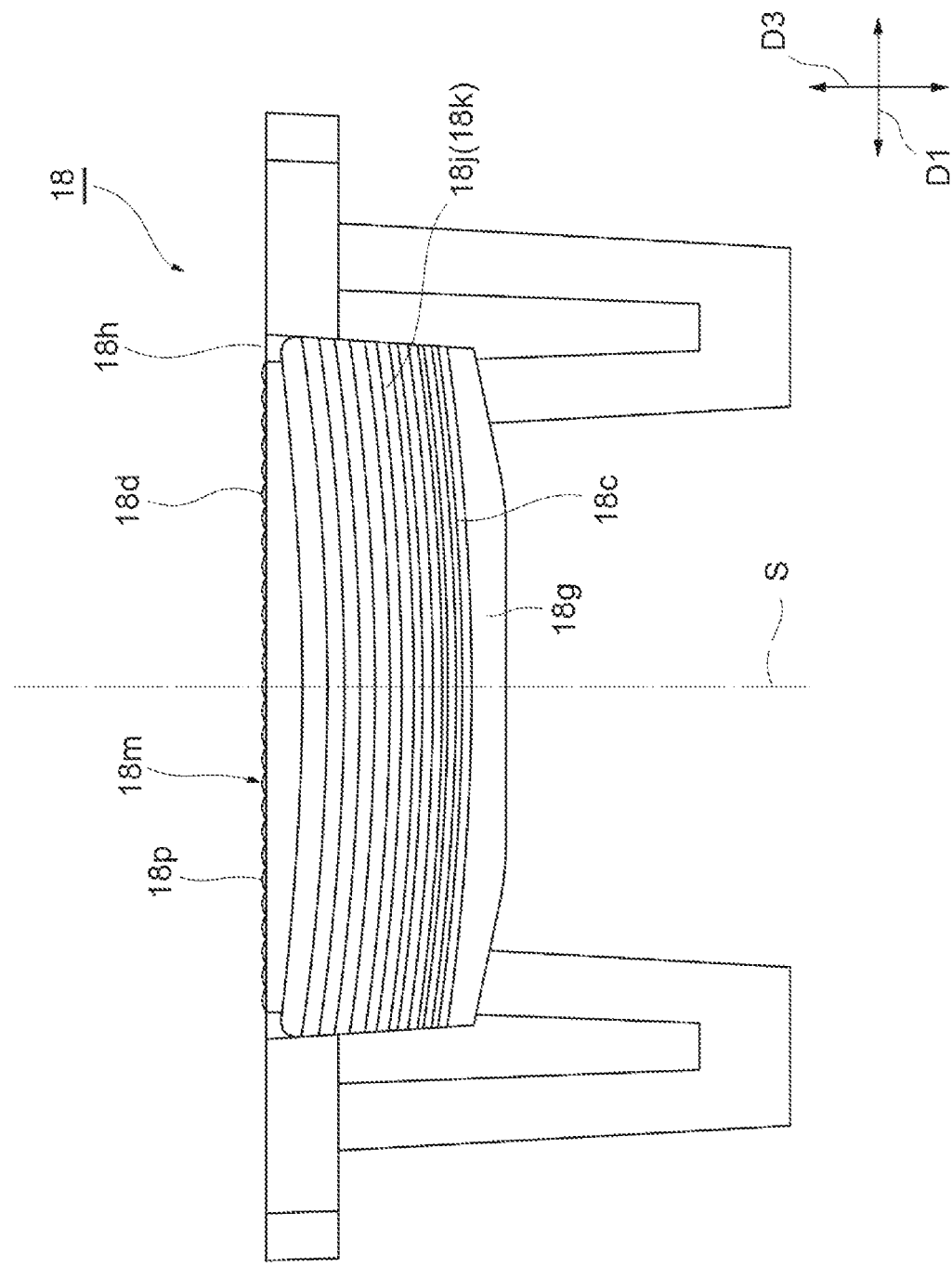
FIG. 11 is a side view of the inner lens of FIG. 10.

FIG. 10 is a perspective view illustrating the inner lens 18. FIG. 11 is a side view of the inner lens 18 as viewed along the second direction D2. As illustrated in FIGS. 7, 10, and 11, for example, the inner lens 18 has a plate shape that gradually becomes thinner as a distance from the circuit board 13 increases. The inner lens 18 is, for example, bilateral-symmetrical with respect to the cross section S.

The inner lens 18 has an incident portion 18b on which the light H from the light source 15 is incident, a reflecting portion 18c that reflects the light H incident from the incident portion 18b toward the outer lens 17, and an emitting portion 18d that emits the light H reflected by the reflecting portion 18c to the outside of the inner lens 18. The incident portion 18b faces the light source 15 along the second direction D2, and has, for example, an incident surface 18f extending along the light source 15 and allowing the light H to be incident inside the inner lens 18.

For example, the reflecting portion 18c is provided on an inner side surface 18g of the inner lens 18 (the back side of the housing 11 or the surface facing the opposite side of the outer lens 17) on the side opposite to the light source 15. As an example, a thickness of the inner lens 18 in the reflecting portion 18c becomes thinner toward the end portion side in the second direction D2.

The emitting portion 18d is provided on an outer surface 18h of the inner lens 18 (the outer side of the housing 11 or the surface facing the outer lens 17 side) on the side opposite to the light source 15. For example, the emitting portion 18d extends along a plane extending in both the first direction D1 and the second direction D2, and the reflecting portion 18c extends diagonally toward the end portion of the second direction D2 of the inner lens 18 so as to approach the emitting portion 18d.

A lens cut 18j is formed on the reflecting portion 18c. The lens cut 18j includes a plurality of unevennesses 18k arranged side by side along the second direction D2. Each unevenness 18k extends along the first direction D1 and extends so as to curve downward toward the center side of the first direction D1. The shape of the unevenness 18k is, for example, a continuous triangular wave shape along the second direction D2.

For example, a lens cut 18m having a shape different from that of the lens cut 18j is formed on the emitting portion 18d. The lens cut 18m includes, for example, a plurality of convex portions 18p arranged along the first direction D1. Each convex portion 18p extends along the second direction D2. For example, the shape of each convex portion 18p is a curved surface that protrudes toward the center of the first direction D1.

The lens cut 18j of the reflecting portion 18c and the lens cut 18m of the emitting portion 18d constitute a light distribution pattern of the light H and have a function of diffusing the light H in a desired manner. The light H reflected and diffused by the lens cut 18j of the reflecting portion 18c is diffused again at the lens cut 18m of the emitting portion 18d and is emitted from the exposure portion 10b of the outer lens 17 to the outside of the BSM unit 10. Since almost the entire exposure portion 10b can be illuminated by the light H, the exposure portion 10b of the BSM unit 10 can be visually recognized.

Next, the action and effect obtained from the BSM unit 10 will be described in detail. As illustrated in FIG. 2, the BSM unit 10 is provided on the side surface 3c of the visor 3 of the outer mirror 1 facing the vehicle body side. Therefore, since the indicator of the BSM unit 10 is not displayed on the mirror 2 of the outer mirror 1 but on the visor 3, the indicator can be displayed at a place different from the scenery reflected on the mirror 2. Therefore, the indicator can be easily visually recognized.

The BSM unit 10 includes the lens 12 that is attached to the housing 11 that accommodates the light source 15 and emits the light H to the outside of the housing 11. At least a portion of the lens 12 (exposure portion 10b) protrudes from the side surface 3c of the visor 3 in the out-of-plane direction of the side surface 3c. Therefore, since at least a portion of the lens 12 that emits the light H to the outside protrudes in the out-of-plane direction of the side surface 3c of the visor 3, the driver or the like of another vehicle can visually recognize the light H from the lens 12.

If the light emitting surface from the lens is flush with the side surface of the visor, an emitting direction of the light may be limited to the driver side of the own vehicle. However, in the BSM unit 10, since at least a portion of the lens 12 protrudes from the side surface 3c of the visor 3, the emitting direction of the light H from the lens 12 is not limited to the driver side of the own vehicle, and includes a wide range such as the rear side of the own vehicle, and the like. Therefore, since the light from the lens 12 can be visually recognized by the driver or the like of another vehicle on the rear side, the driver or the like of another vehicle can grasp the existence of the own vehicle.

In addition, the height of the lens 12 with respect to the side surface 3c of the visor 3 may be increased toward the rear side of the vehicle. In this case, since the height of the lens 12 increases toward the rear side, it is possible to make it easier for the driver of the vehicle on the rear side to visually recognize the lens 12. In addition, when the height of the lens 12 increases toward the rear side, the BSM unit 10 can be easily assembled to the visor 3.

In addition, the lens 12 may be provided on the rear side of the vehicle on the side surface 3c of the visor 3. In this case, since the lens 12 is provided on the rear side of the vehicle on the side surface 3c of the visor 3, the lens 12 is provided at a position close to the mirror 2 of the outer mirror 1. Therefore, since the distance from the line of sight of the driver of the own vehicle who visually recognizes the mirror 2 to the lens 12 can be shortened, the driver of the own vehicle can more easily and visually recognize the lens 12. In addition, by providing the lens 12 on the rear side of the side surface 3c of the visor 3, it becomes easier for the driver of another vehicle on the rear side to visually recognize the shinning lens 12.

As illustrated in FIGS. 6 and 8, in the BSM unit 10, the shape of the exposed portion (exposure portion 10b) of the lens 12 includes the center 10p of the exposure portion 10b and the edge portion 3d of the visor 3, and is bilateral-symmetrical with respect to the cross section S orthogonal to the side surface 3c of the visor 3. That is, when the exposure portion 10b is viewed from the edge portion 3d of the visor 3, the exposure portion 10b is bilateral-symmetrical.

Therefore, since the exposure portion 10b of the lens 12 has a bilateral-symmetrical shape, the BSM unit 10 for the left side of the vehicle and the BSM unit 10 for the right side of the vehicle can be shared. As a result, it is possible to suppress costs in design and manufacturing, and it is possible to suppress errors in assembly and the like, so that parts can be assembled easily and with high accuracy.

In addition, the housing 11 has a pair of fixing portions 11f fixed to the visor 3, and the pair of fixing portions 11f may be bilateral-symmetrical with respect to the cross section S. In this case, the housing 11 is provided with the pair of fixing portions 11f, and the pair of fixing portions 11f are bilateral-symmetrical. Therefore, the structure and method of assembling the housing 11 can be shared for the left side of the vehicle and the right side of the vehicle. Therefore, it contributes to the reduction of costs in design and manufacturing.

As illustrated in FIGS. 7 and 11, the lens 12 includes the outer lens 17 exposed on the side surface 3c of the visor 3 and the inner lens 18 that guides the light H from the light source 15 to the outer lens 17, and the inner lens 18 has the lens cuts 18j and 18m through which the light H from the light source 15 passes, and the lens cuts 18j and 18m may be bilateral-symmetrical with respect to the cross section S.

In this case, the lens cuts 18j and 18m of the inner lens 18 can be shared for the left side of the vehicle and the right side of the vehicle. Therefore, the emission pattern of the light H can be easily shared at the time of assembly. In addition, since the inner lens 18 can be shared for the left side and the right side, it contributes to the cost reduction of the inner lens 18.

In addition, the BSM unit 10 includes the connector portion 14 electrically connected to the light source 15, and the shape of the connector portion 14 may be bilateral-symmetrical with respect to the cross section S. In this case, the shape of the connector portion 14 can be shared for the left side of the vehicle and the right side of the vehicle. Therefore, the connector portion 14 can be easily assembled, and the cost of the connector portion 14 can be reduced.

As illustrated in FIG. 5, the visor 3 has the wall surface 3p positioned inside the mirror 2 of the outer mirror 1, and the housing 11 may be fixed to the wall surface 3p. In this case, since the housing 11 is fixed to the wall surface 3p positioned inside the mirror 2, and the fixing portion 11f of the housing 11 can be prevented from being exposed to the side surface 3c of the visor 3, the unevenness of the side surface 3c of the visor 3 can be reduced. Therefore, since the structure of the side surface 3c of the visor 3 can be simplified, a configuration of a mold used at the time of molding the visor 3 can be simplified. As a result, the design and manufacturability of the side surface 3c of the visor 3 can be improved.

As illustrated in FIGS. 7 and 11, the lens 12 includes the outer lens 17 exposed on the side surface 3c of the visor 3 and the inner lens 18 that guides the light H from the light source 15 to the outer lens 17, and the inner lens 18 may have the reflecting portion 18c that reflects the light H from the light source 15 and the emitting portion 18d that emits the light H reflected by the reflecting portion 18c toward the outer lens 17.

Then, the lens cut 18j may be formed on the reflecting portion 18c, and the lens cut 18m may be formed on the emitting portion 18d. In this case, since the lens cuts 18j and 18m are formed on both the reflecting portion 18c and the emitting portion 18d of the inner lens 18, the effect of diffusing the light H by the inner lens 18 can be enhanced. Therefore, since the light H from the lens 12 can be diffused over a wider range, the visibility of the BSM unit 10 can be improved.

The embodiment of the BSM unit according to the present disclosure has been described above. However, the present invention is not limited to the above-described embodiment, and may be modified or applied to other things without changing the gist described in each claim. That is, the shape, size, number, material, and arrangement of each portion of the BSM unit according to the present disclosure can be appropriately changed within the scope of the above gist.

For example, in the above-described embodiment, the BSM unit 10 having at least a portion protruding from the side surface 3c of the visor 3 in the out-of-plane direction of the side surface 3c has been described. However, the BSM unit may not protrude from the side surface 3c of the visor 3. In addition, in the above-described embodiment, an example in which the BSM unit 10 is provided at a position adjacent to the edge portion 3d, and the linear portion 3h extending along the first direction D1 is formed between the BSM unit 10 and the edge portion 3d has been described. However, the arrangement place of the BSM unit is not limited to the above example and can be changed as appropriate.

Figure 12:
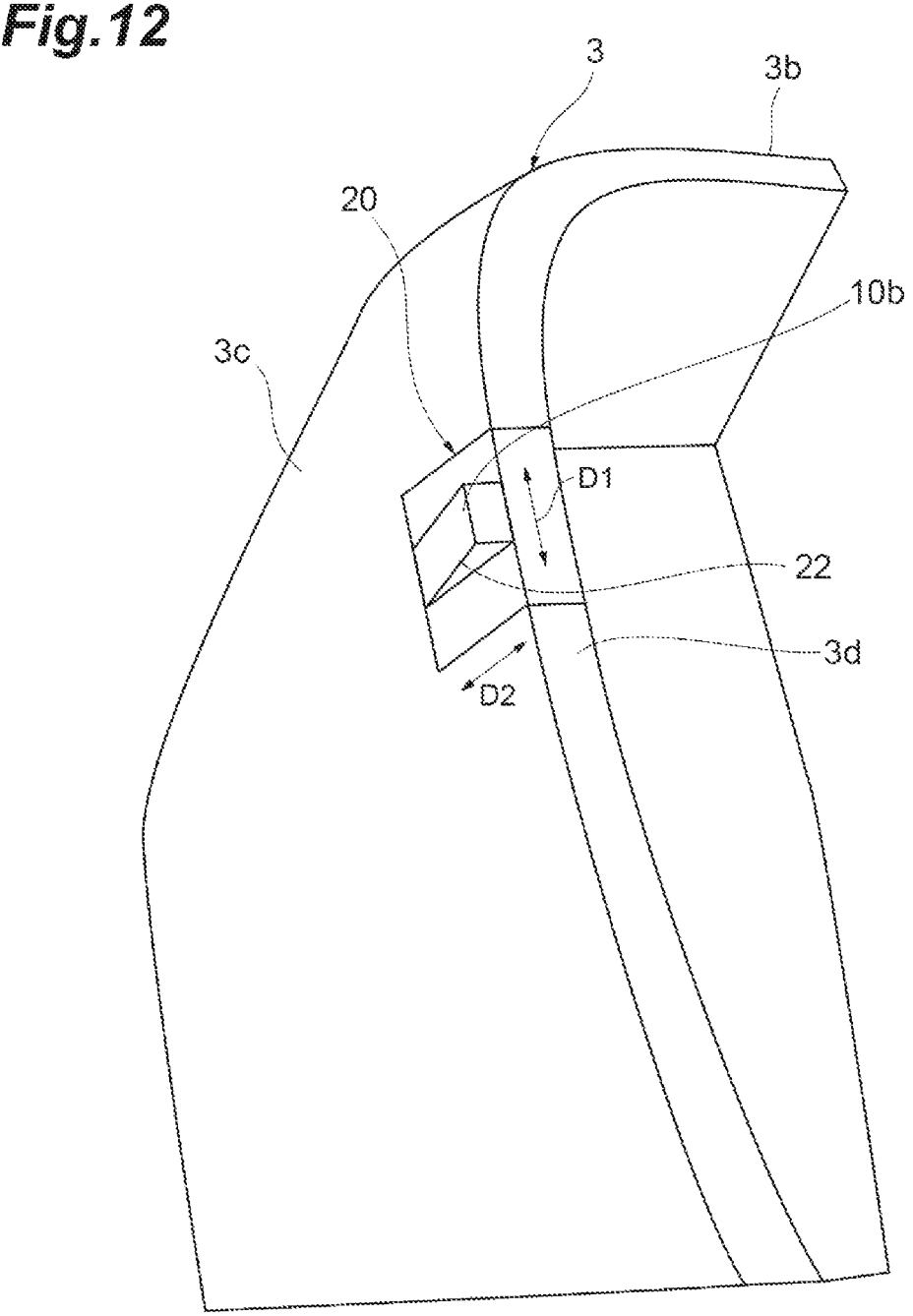
FIG. 12 is a perspective view illustrating a BSM unit and a visor according to a modified example.

FIG. 12 illustrates a BSM unit 20 according to a modified example. The BSM unit 20 includes, for example, a lens 22 that emits light H, and at least a portion of the lens 22 is exposed on the side surface 3c of the visor 3. Then, at least a portion of the lens 22 reaches the edge portion 3d of the visor 3.

Since the BSM unit 20 is provided on the side surface 3c of the visor 3 facing the vehicle body side like the BSM unit 10 described above, the indicator can be displayed at a place different from the scenery reflected on the mirror 2. Therefore, the indicator can be easily visually recognized. Then, at least a portion of the lens 22 is exposed on the side surface 3c of the visor 3 and reaches the edge portion 3d of the visor 3.

Therefore, since the lens 22 that emits the light H to the outside is exposed on the side surface 3c of the visor 3 and reaches the edge portion 3d of the visor 3, the emitting direction of the light from the lens 22 is not limited to the driver of the own vehicle, but includes a wide range such as the rear of the own vehicle. Therefore, since the driver or the like of the vehicle on the rear side can visually recognize the light H from the lens 22, the existence of the own vehicle can be grasped by the driver or the like of another vehicle. From the above, the same action and effect as the above-mentioned BSM unit 10 can be obtained from the BSM unit 20.

In addition, in the above-described embodiment, an example in which the lens 12 includes the outer lens 17 and the inner lens 18 which are separated from each other has been described. However, the lens of the BSM unit may be an integral lens. Further, in the above-described embodiment, the BSM unit 10 in which the shape of each portion is bilateral-symmetrical with respect to the cross section S has been described. However, a portion of the BSM unit does not have to be bilateral-symmetrical with respect to the cross section S. For example, at least one of the housing 11, the lens 12, the circuit board 13, and the connector portion 14 does not have to be bilateral-symmetrical with respect to the cross section S.

As described above, the shape of each portion of the BSM unit can be appropriately changed within the scope of the above-mentioned gist. Further, the shape, size, type, and arrangement of the outer mirror to which the BSM unit is attached can be changed as appropriate.

What is claimed is:

1. A BSM unit attached to a side surface of a visor of an outer mirror that is provided to a vehicle body of a vehicle, the side surface of the visor faces the vehicle body, and the BSM unit comprising:
   a light source;
   a housing that accommodates the light source; and
   a lens that is attached to the housing and emits light from the light source to an outside of the housing, the lens includes: an outer lens and an inner lens,
   wherein only a portion of the outer lens protrudes from the side surface of the visor in an outward direction extending from the side surface of the visor towards the vehicle body, and
   the outer lens comprising a base portion mounted on the housing, a first convex portion protruding outwardly from the base portion, and a second convex portion protruding outwardly from the first convex portion so as to provide the portion of the outer lens that protrudes from the side surface of the visor.

2. The BSM unit according to claim 1, wherein, with respect to a direction generally perpendicular to the side surface, the base portion is positioned inside an area of the housing, the first convex portion is positioned inside an area of the base portion, and the second convex portion is positioned inside an area of the first convex portion.

3. The BSM unit according to claim 1, wherein, with respect to the direction generally perpendicular to the side surface, a shape of at least a portion of the base portion and a shape of at least a portion of the first convex portion each comprise a rounded rectangular shape.

4. The BSM unit according to claim 1, wherein, with respect to the direction generally perpendicular to the side surface, a shape of the second convex portion is rectangular.

5. The BSM unit according to claim 1, wherein a transmittance of light of the outer lens is lower than a transmittance of light of the inner lens.

6. The BSM unit according to claim 1, wherein a transmittance of light of the outer lens is about 40% and a transmittance of light of the inner lens is about 90%.

7. The BSM unit according to claim 1, wherein the inner lens is colorless and transparent, and the outer lens is colored in black and transparent.

8. A BSM unit attached to a side surface of a visor of an outer mirror that is provided to a vehicle body of a vehicle, the side surface of the visor faces the vehicle body, the visor having a front side nearer to a front of the vehicle body than an opposing rear side of the visor, and the
   BSM unit comprising:
   a light source;
   a housing that accommodates the light source; and
   a lens that is attached to the housing and emits light from the light source to an outside of the housing, the lens includes: an outer lens and an inner lens, wherein only a portion of the outer lens protrudes from the side surface of the visor in an outward direction extending from the side surface of the visor towards the vehicle body,
   the outer lens comprises a base portion mounted on the housing, a first convex portion protruding outwardly from the base portion, and a second convex portion protruding outwardly from the first convex portion so as to provide the portion of the outer lens that protrudes from the side surface of the visor, and
   wherein the visor
   has an edge portion provided on a part of the side surface of the visor so as to be adjacent the rear side of the visor, and the edge portion surrounding a mirror of the outer mirror, and
   at least a portion of the lens is exposed on the side surface of the visor and reaches the edge portion of the visor.

9. The BSM unit according to claim 8, wherein, with respect to a direction generally perpendicular to the side surface, the base portion is positioned inside an area of the housing, the first convex portion is positioned inside an area of the base portion, and the second convex portion is positioned inside an area of the first convex portion.

10. The BSM unit according to claim 8, wherein, with respect to the direction generally perpendicular to the side surface, a shape of at least a portion of the base portion and a shape of at least a portion of the first convex portion each comprise a rounded rectangular shape.

11. The BSM unit according to claim 8, wherein, with respect to the direction generally perpendicular to the side surface, a shape of the second convex portion is rectangular.

12. The BSM unit according to claim 8, wherein a transmittance of light of the outer lens is lower than a transmittance of light of the inner lens.

13. The BSM unit according to claim 8, wherein a transmittance of light of the outer lens is about 40% and a transmittance of light of the inner lens is about 90%.

14. The BSM unit according to claim 8, wherein the inner lens is colorless and transparent, and the outer lens is colored in black and transparent.

15. A BSM unit attached to a side surface of a visor of an outer mirror that is provided to a vehicle body of a vehicle, the side surface of the visor faces the vehicle body, and the BSM unit comprising:
   a light source;
   a housing that accommodates the light source; and
   a lens that is attached to the housing and emits light from the light source to an outside of the housing, the lens includes: an outer lens and an inner lens,
wherein only a portion of the outer lens protrudes from the side surface of the visor in an outward direction extending from the side surface of the visor towards the vehicle body,
   wherein, with respect to a direction generally perpendicular to the side surface, a base portion of the outer lens is positioned inside an area of the housing, a first convex portion of the outer lens is positioned inside an area of the base portion, and a second convex portion of the outer lens is positioned inside an area of the first convex portion.

16. The BSM unit according to claim 15, wherein, with respect to the direction generally perpendicular to the side surface, a shape of at least a portion of the base portion and a shape of at least a portion of the first convex portion each comprise a rounded rectangular shape.

17. The BSM unit according to claim 15, wherein, with respect to the direction generally perpendicular to the side surface, a shape of the second convex portion is rectangular.

18. The BSM unit according to claim 15, wherein a transmittance of light of the outer lens is lower than a transmittance of light of the inner lens.

19. The BSM unit according to claim 15, wherein the inner lens is colorless and transparent, and the outer lens is colored in black and transparent.

20. The BSM unit according to claim 15, wherein a transmittance of light of the outer lens is about 40% and a transmittance of light of the inner lens is about 90%.

* * * * *